US007087332B2

(12) United States Patent
Harris

(10) Patent No.: US 7,087,332 B2
(45) Date of Patent: Aug. 8, 2006

(54) POWER SLOPE TARGETING FOR DC GENERATORS

(75) Inventor: Brent Earle Harris, Calgary (CA)

(73) Assignee: Sustainable Energy Systems, Inc., Calgary (CA)

( * ) Notice: Subject to any disclaimer, the term of this patent is extended or adjusted under 35 U.S.C. 154(b) by 0 days.

(21) Appl. No.: 10/210,545

(22) Filed: Jul. 31, 2002

(65) Prior Publication Data

US 2004/0021445 A1 Feb. 5, 2004

(51) Int. Cl.
*H01M 8/04* (2006.01)

(52) U.S. Cl. .......................... 429/17; 429/19; 323/299; 323/271

(58) Field of Classification Search ................ 320/126, 320/124, 133, 134, 136, 33, 48, 101; 323/299, 323/295, 275, 222, 304; 363/95, 65, 71; 376/333, 210, 216; 429/13, 22, 23, 17, 9, 429/30, 19, 21, 34; 180/65.2, 65.5
See application file for complete search history.

(56) References Cited

U.S. PATENT DOCUMENTS 4,202,933 A * 5/1980 Reiser et al. ................. 429/13
4,330,367 A * 5/1982 Musick ....................... 376/245
4,367,196 A * 1/1983 Wende et al. ............... 376/333
4,375,662 A * 3/1983 Baker .......................... 363/95
4,510,434 A * 4/1985 Assbeck et al. ............ 323/237
4,678,983 A * 7/1987 Rouzies ...................... 323/222
4,689,133 A * 8/1987 McIlhenny .................. 204/269
5,327,071 A * 7/1994 Frederick et al. ........... 323/299
5,366,821 A * 11/1994 Merritt et al. ................ 429/21
5,714,874 A * 2/1998 Bonnefoy ................... 323/299
5,763,113 A * 6/1998 Meltser et al. ................ 429/13
5,898,282 A * 4/1999 Drozdz et al. .............. 318/139
6,015,634 A * 1/2000 Bonville et al. .............. 429/17
6,096,449 A * 8/2000 Fuglevand et al. ........... 429/13
6,175,217 B1 * 1/2001 Da Ponte et al. ............. 322/19
6,242,120 B1 * 6/2001 Herron ........................ 429/22
6,324,042 B1 * 11/2001 Andrews ................... 361/93.2
6,428,917 B1 * 8/2002 Lacy et al. ................... 429/13
6,587,766 B1 * 7/2003 Bruckner ..................... 701/22
6,656,618 B1 * 12/2003 Iwase .......................... 429/23

* cited by examiner

*Primary Examiner*—Rajnikant B. Patel
(74) *Attorney, Agent, or Firm*—Marger Johnson & McCollom, P.C.

(57) ABSTRACT

A simple feedback control loop, in conjunction with an improved maximum power point tracking intermediate controller, can be used ensure efficient operation of a power generator. The improved maximum power point tracking controller operates the generator at its maximum allowable power point. A power output of the generator is measured and compared to a power output setpoint. Operating characteristics of the generator are then adjusted to cause the maximum allowable power point and measured power output to approximate the power output setpoint. Although applicable to all types of generators, this is particularly beneficial in fuel cell generator systems and other systems where damage to generator components can occur if operated above a maximum allowable power output level. In other systems, the maximum allowable power output may approach or equal a maximum power point (or maximum possible power point).

30 Claims, 3 Drawing Sheets

POWER SLOPE TARGETING FOR DC GENERATORS

BACKGROUND OF THE INVENTION

1. Field of the Invention

The present invention relates to a method of efficiently operating a direct current (DC) generator. More particularly, this invention relates to a method of using power curve characteristics of a DC generator to operate the generator efficiently.

2. Description of the Related Art

A DC generator (such as a photovoltaic (PV) cell, a fuel cell, a wind turbine, or a microturbine, for example) has a polarization curve that represents a relationship between voltage and current generated by the generator. The polarization curve varies depending on the operating conditions of the DC generator.

FIG. 1A is a generalized polarization curve for a PV cell. As shown in FIG. 1A, the polarization curve of a PV cell varies depending primarily on cell temperature and on an amount of solar radiation incident on the cell. In a DC generator, PV cells can be interconnected together to form a stack or array having a higher power capacity. The stack or array, however, retains the same characteristic polarization curve.

A polarization curve can be converted into a power curve using the relationship:

$$\text{Power}=\text{Voltage}\times\text{Current}$$

FIG. 2A is a graph illustrating a power curve for a DC generator. Referring to FIG. 2A, a power curve is a graph representing the relationship between power and either voltage or current with respect to a given set of operating parameters. The power curve (expressed in terms of either voltage or current) has a global maximum, referred to as a maximum power point (MPP). Although the specific voltage or current at which the global maximum occurs changes as the shapes of the polarization and power curves change with operating conditions, the point is always defined the same way. On the power curve, for example, the MPP is typically the point at which the slope of the curve equals zero (0). On the polarization curve, the MPP is generally the point at which the percentage change in current and voltage are equal but opposite.

To extract the maximum power possible from the DC generator, the operating current and voltage of the generator should be controlled in such a way as to operate as close as possible to the global maximum at all times. This principle, called Maximum Power Point Tracking (MPPT), has been applied successfully in PV systems.

Conventionally, MPPT is performed using a perturb and observe method. In this method, the voltage and current of a photovoltaic cell are measured while an operating voltage is varied. A power output is calculated using the measured voltage and current. The voltage is, for example, first decreased until the measured power begins to decrease. The voltage is then increased until the measured power begins to decrease again. These steps are continuously repeated. In this manner, the operating point of the photovoltaic cell is constantly varying, but always remains very near the global maximum of the power curve. This method is also able to track changes to the global maximum that occur as a result of variations in operating conditions.

A variation on this technique includes observing and analyzing DC voltage and current ripple. Another variation includes occasionally disconnecting the generator from the electrical power system temporarily while using a separate circuit to trace the full polarization curve.

SUMMARY OF THE INVENTION

According to one embodiment of the invention, a method of maximum power point tracking can be used to efficiently operate a fuel cell system.

Another embodiment of this invention provides an improved method of power point tracking applicable to all DC generators that operate the generator at a specific maximum allowable power point below the global maximum.

Yet another aspect of this invention relates to a method of using an improved method of power point tracking to control a fuel cell system in a manner that significantly reduces the cost of the system.

A method of controlling a generator preferably includes evaluating generator characteristics to determine a target slope on a curve representing generator characteristics. The curve can, for example, be either a power curve or a polarization curve. The target slope can then be used to determine a maximum allowable power point for a set of operating conditions. The maximum allowable power point represents a power output level which, if operated above, may cause damage to the generator. The generator is therefore preferably operated to generate a power output approximating the maximum allowable power point.

Control of the output of the power system is preferably accomplished by measuring a power output from the system and generating a control signal in response to a difference between the measured power output and a power output setpoint. The generator characteristics are then adjusted in response to the control signal to cause the measured power output to approach the power output setpoint.

If the generator is a fuel cell system, operating the generator to generate a power output approximating the maximum allowable power point at the power output setpoint is preferably accomplished by controlling the power output using the improved method of maximum power point tracking, measuring a power output from the fuel cell system, comparing the power output from the fuel cell system with the power output setpoint, and generating a control signal based on a difference between the measured power output and the power output setpoint. A flow or pressure controller can then be operated responsive to the control signal to increase or decrease reactant flow to the fuel cell to cause the maximum allowable power point to approach the power output setpoint.

According to another embodiment of the invention, a generator can include a power generating device and a power measuring device configured to measure a power output from the power generating device. A power slope targeting controller can be provided and configured to operate the power generating device at a maximum allowable power point based on a power slope target for the generator. A comparator compares the measured power output with the power output setpoint to generate a control signal based on a difference between the measured power output and the power output setpoint. A power controller controls the reactant flow to the generator in response to the control signal from the comparator.

When the power generating device is a fuel cell, the power controller preferably includes a flow controller configured to control a flow rate of reactants into the fuel cell based on the control signal. The flow controller is preferably configured to increase the flow rate of fuel into the fuel cell when the control signal indicates that the measured power output is below the power output setpoint. The flow controller is further preferably configured to decrease the flow rate of fuel into the fuel cell when the control signal indicates that the measured power output is above the power output setpoint.

In essence, according to various principles of this invention, a simple feedback control loop coupled with a power slope targeting power control system can ensure efficient operation of a power generator. The power slope targeting power control system operates the generator at a maximum allowable power point, determined based on the characteristics of that particular generator, at all times. The feedback control loop, by measuring a power output of the generator and comparing the measured power output to a power output setpoint, can control the operating characteristics of the generator to increase or decrease power output. Generator efficiency can thereby be maintained. Although applicable to all types of generators, this is particularly beneficial in fuel cell generator systems and other systems where damage to generator components can occur if operated above a maximum allowable power output level.

BRIEF DESCRIPTION OF THE DRAWINGS

The foregoing and additional aspects and advantages of the present invention will become more readily apparent through the following detailed description of preferred embodiments, made with reference to the attached drawings, in which.

DETAILED DESCRIPTION OF PREFERRED EMBODIMENTS

The principles of the present invention will be described more fully hereinafter with reference to preferred embodiments thereof. It should be noted, however, that the following embodiments may be modified in various forms, and that the scope of the present invention is not limited to these specific embodiments. The embodiments of the present invention are provided by way of example, and not by way of limitation.

Conventional methods of maximum power point tracking, as applied to PV cells and DC wind turbines, generally search for the global power maximum. This is the point where the slope of the power curve is approximately zero or the point on the polarization curve where the percent change in voltage is equal and opposite to the percent change in current. Unfortunately, however, for various reasons, this method has not been readily applicable to fuel cell systems.

Although the industry would benefit from the application of a maximum power point tracking method to fuel cells, fuel cells are delicate devices and excessive current draw can result in damage to the materials in the fuel cell and in accelerated degradation of fuel cell performance. If the physical properties of the fuel cell are known, the maximum allowable current draw can be calculated from measured instantaneous operating conditions. Measuring reactant concentrations, however, generally requires complex and expensive instrumentation.

According to a preferred embodiment of this invention, a Power Slope Targeting (PST) algorithm is provided to search for a target slope on the power curve of a DC generator. Unlike MPPT, the target slope of the PST algorithm is not necessarily zero. The PST target slope will correspond to a maximum allowable power point (MAPP) that is determined from the characteristics of the generator. The target slope can be a fixed value or can be adjusted to compensate for changes in the MAPP due to variations in operating conditions.

In certain systems, such as PV systems, where there is no restriction on the current draw from the source, the maximum allowable power point is equal to the maximum power point. Accordingly, in such a case, the target slope is zero and the system operates in a manner similar to the conventional MPPT algorithms described above.

Figure 1A:
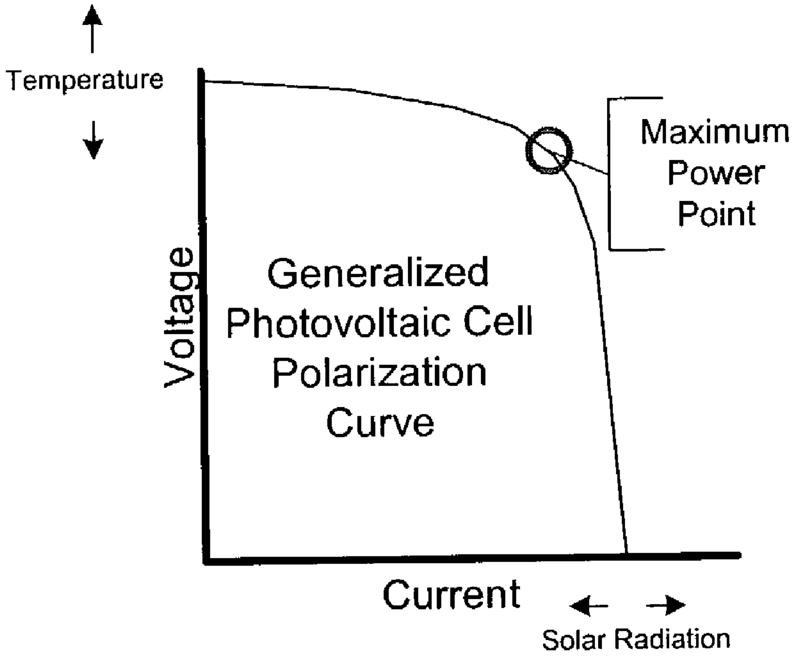
FIG. 1A (BACKGROUND ART)
FIG. 1A is a graph illustrating a polarization curve for a conventional PV cell.
Figure 1B:
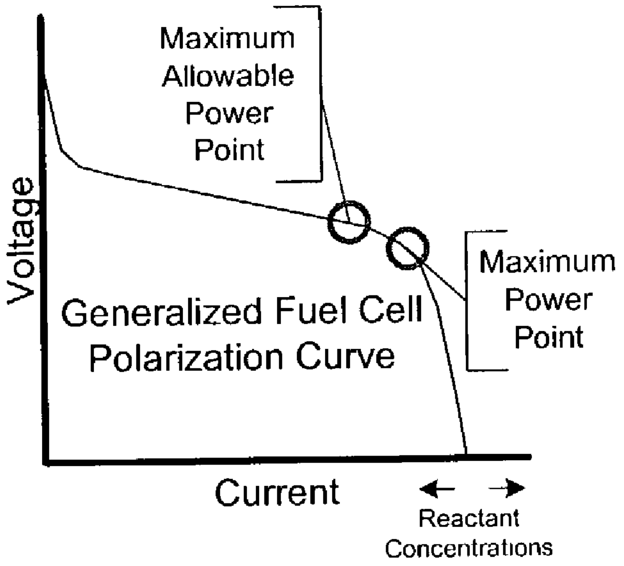
FIG. 1B (BACKGROUND ART)
FIG. 1B is a graph illustrating a polarization curve for a fuel cell.

FIG. 1B is a graph representing the polarization curve of a fuel cell. As shown in FIG. 1B, the polarization curve of a fuel cell varies depending primarily on the concentration of the reactants at the anode and cathode of the cell. Although the polarization curve of the fuel cell is also affected by cell temperature, in a fuel cell system at steady state, the cell temperature will generally remain relatively constant. Fuel cells can also be interconnected together to form a stack or array having a higher power capacity but the same characteristic polarization curve.

Figure 2A:
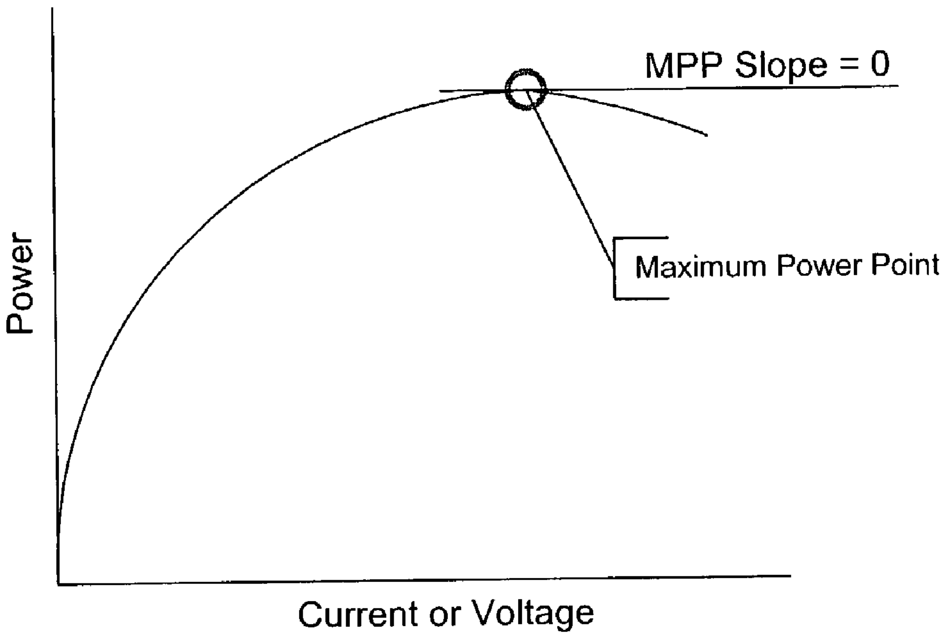
FIG. 2A (BACKGROUND ART)
FIG. 2A is a graph illustrating a power curve used in a conventional maximum power point tracking method.
Figure 2B:
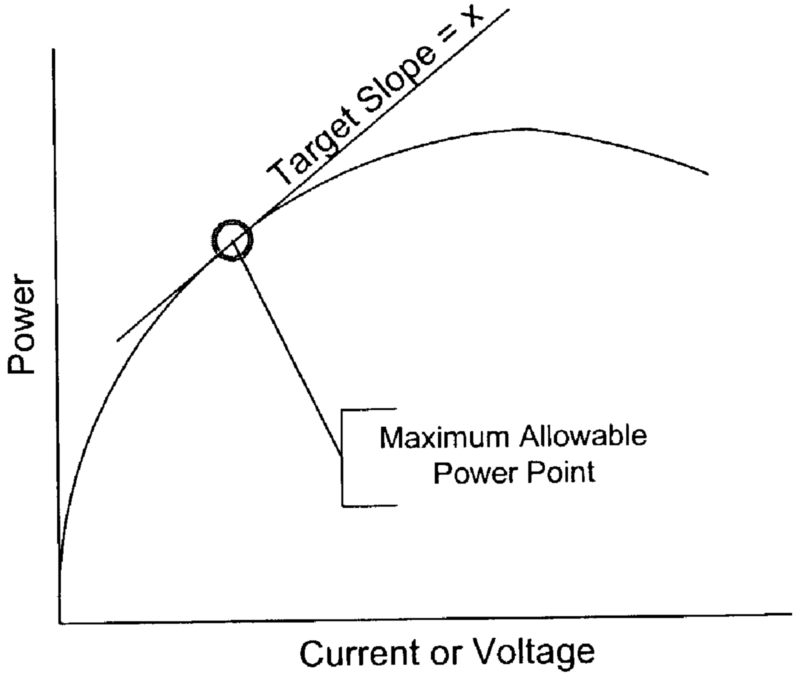
FIG. 2B is a graph illustrating a power curve as used in a preferred embodiment of the present invention.

FIG. 2B is a graph illustrating a power curve of a fuel cell according to a preferred embodiment of this invention. Referring to FIG. 2B, in the case of a fuel cell, the maximum allowable power point corresponds to the current draw just below that which would begin to cause damage to the fuel cell materials, such as by starving the cell of reactants. This occurs at approximately the same relative point on the power curve (i.e., the same slope) regardless of the magnitude of the curve.

As the fuel cell begins to be starved of reactants, the voltage of the cell decreases more significantly with each increase in current. The target slope will be fixed based on the specific properties of the fuel cell, and may change slightly as a function of power output. All of this can be addressed in the programming of a fuel cell controller. As fuel cell technology matures and becomes more rugged, it is likely that the Maximum Allowable Power Point will move up the power curve toward the global maximum, and may eventually even become the same as the Maximum Power Point.

It should be noted that each point on the power curve corresponds to a specific point on the polarization curve. The maximum power point (slope=0) on the power curve, for example, corresponds to the point on the polarization curve where the percentage change in current and voltage are equal but opposite (with a slope specific to the generator and its actual operating conditions). As such, the principles of the invention can be applied equally well using the target slope of the power curve, as described previously, or using a target slope of the polarization curve.

Figure 3:
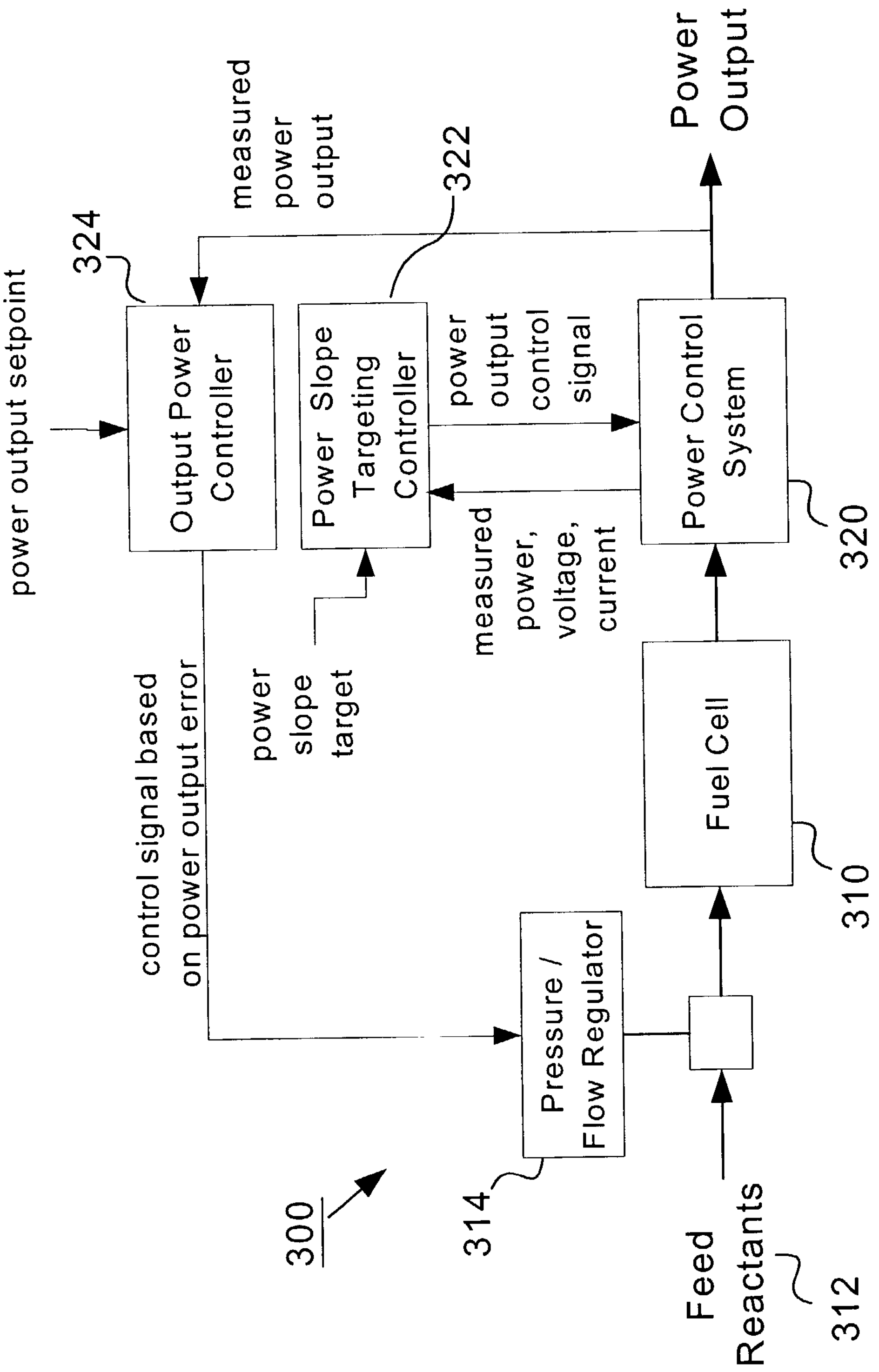
FIG. 3 is a block diagram of a DC generator incorporating a power controller according to another preferred embodiment of the invention.

According to another aspect of this invention, the control of a fuel cell system can be simplified. FIG. 3 is a schematic block diagram of a DC generator using fuel cells as the power source (i.e., a fuel cell system). Although fuel cells are delicate devices, they behave reliably and repeatably. Once the characteristics of a fuel cell system are known, it is not necessary to measure the precise rate of fuel delivery to the system to ensure optimal system performance. All that is necessary is to operate the system as close to its maximum allowable power point as possible at all times. This ensures maximum system operating efficiency without damaging the generator. When connected to a grid, any excess power generated by the generator can be distributed for use by other grid-connected devices. The rate of fuel delivery to the system must still be controlled to control the actual power output at the maximum allowable power point, but a simple control loop can be used to measure the actual power output and control a pressure or flow regulator based on an error between the measured power and the setpoint.

Referring to FIG. 3, a fuel cell generator system 300 includes a power slope targeting controller 322, a power control system 320, and an output power controller 324. Fuel cells 310 provide power for the generator system 300. The amount of power available depends on an amount of feed reactants 312 being supplied to the fuel cells 310. The flow of feed reactants 312 into the fuel cells 310 is controlled through a pressure/flow regulator 314.

More particularly, a power slope target is input into the power slope targeting controller 322. The power slope target is preferably based on a maximum allowable power point for the fuel cell generator system 300. The power control system 320 produces a power output approximating the maximum allowable power point. The power output is measured, and the output power controller 324 compares the measured power output with a power output setpoint. The output power controller 324 produces a control signal based on a power output error representing a difference between the measured power output and the power output setpoint. The control signal is then used to control a pressure/flow rate of the pressure/flow regulator 314.

Using the foregoing system, a simple control loop is used to control the rate of input of feed reactants into the system and therefore the power output of the system. The power slope targeting controller 322, output power controller 324, and power control system 320 are used to operate the system efficiently without the need for complex measurement and analysis equipment to determine system characteristics. Although this system does not eliminate the need for the temperature and pressure measurements required for equipment safety reasons, it does eliminate the need for complex, expensive feed-forward control loops.

While the principles of this invention have been shown and described with reference to a preferred embodiment thereof, it will be understood by those skilled in the art that various changes in form and details may be made without departing from those principles. The invention should therefore be interpreted to encompass all such variations coming within the spirit and scope of the appended claims.

What is claimed is:

1. A method comprising:

determining a maximum allowable power output of a fuel cell by determining a point on a power curve of the fuel cell at which additional power output may cause damage to the fuel cell, a slope of the power curve at the point characterized as non-zero;

measuring a power output from the fuel cell;

adjusting one or more electrical parameters of the fuel cell to cause an actual power output of the fuel cell to approximate the maximum allowable power output by controlling a rate of fuel input into the fuel cell to control the power output thereof.

2. The method of claim 1, wherein adjusting one or more electrical parameters of the fuel cell comprises controlling a voltage of the fuel cell.

3. The method of claim 1, wherein determining the maximum allowable power output of the fuel cell comprises varying a voltage level of the fuel cell while measuring a power output thereof.

4. The method of claim 1, wherein determining the maximum allowable power output and adjusting one or more parameters of the fuel cell to obtain the maximum allowable power output comprises repeatedly decreasing a voltage level of the fuel cell until the measured power output begins to decrease at a rate greater than the target slope then increasing the voltage level of the fuel cell until the measured power output begins to increase at a rate less than the target slope.

5. The method of claim 1, wherein determining the maximum allowable power output comprises tracing a polarization curve of the fuel cell for a current set of operating conditions and identifying a point on the polarization curve having a target slope that corresponds to the maximum allowable power output.

6. The method of claim 1, wherein determining the maximum allowable power output comprises analyzing DC voltage and current ripple of the fuel cell.

7. The method of claim 1, wherein controlling the rate of fuel input into the fuel cell comprises increasing the rate of fuel input to increase power output and decreasing the rate of fuel input to decrease power output.

8. A method comprising:

identifying a maximum allowable power point (MAPP) for a fuel cell by determining a target slope of a power curve corresponding to a point above which damage to the fuel cell may result from increased power output, the MAPP representing a first power output from the fuel cell that is less than a second power output that corresponds to a maximum power point (MPP) of the fuel cell; and operating the fuel cell to generate a third power output that is approximately equal to the first power output.

9. The method of claim 8, wherein operating the fuel cell to generate the third power output comprises measuring a slope of the power curve at a present operating point; comparing the measured slope to the target slope; and adjusting one of the fuel cell operating parameters to cause the measured slope to approximate the target slope.

10. The method of claim 9, wherein adjusting one or more characteristics of the fuel cell comprises adjusting the voltage of the fuel cell.

11. A method comprising:

determining the operating characteristics of a fuel cell system;

identifying a maximum allowable power point (MAPP) for the fuel cell system using the operating characteristics of the fuel cell system, the MAPP less than a maximum power point (MPP) where a maximum power output may be obtained from the fuel cell system, the MAPP representing a power output level above which damage would result to the fuel cell system; and operating the fuel cell system at or about the MAPP.

12. The method of claim 11, further comprising measuring a power output from the fuel cell system.

13. The method of claim 12, further comprising controlling a rate of fuel delivery to the fuel cell system to control a power output of the fuel cell system.

14. The method of claim. 12, wherein the maximum allowable power point corresponds to a target slope on a power curve for a given set of operating characteristics.

15. A circuit comprising:

a power measuring device configured to measure a power output from a fuel cell system;

a comparison circuit configured to compare the power output with a maximum allowable power point (MAPP) of the fuel cell system, the MAPP less than a maximum power point (MPP) of the fuel cell system, the MAPP corresponding to a power level above which damage may result to the fuel cell; and a fuel flow controller configured to control a feed rate of reactants to the fuel cell based on a difference between the power output and the power setpoint.

16. The circuit of claim 15, further comprising a power slope targeting controller configured to receive a power slope target corresponding to the MAPP.

17. The circuit of claim 15, wherein the comparison circuit comprises an output power controller configured to produce a control signal based on a power output error corresponding to a measured difference between the power output and the MAPP.

18. The circuit of claim 17, wherein the fuel flow controller operates in response to the control signal.

19. A method comprising:

evaluating characteristics of a fuel cell system to determine a target slope on a curve, the curve representing the characteristics of the fuel cell system, the target slope not necessarily zero, the curve selected from the group consisting of a power curve and a polarization curve;

using the target slope to determine a maximum allowable power point (MAPP) for a set of fuel cell system operating conditions, the MAPP representing the greatest power output that may be obtained from the fuel cell system without damaging or impairing the fuel cell system, the MAPP not necessarily equal to a maximum power point (MPP) for the fuel cell system; and controlling the fuel cell system to generate a power output that approximates the MAPP.

20. The method of claim 19, wherein controlling the fuel cell system to generate a power output that approximates the MAPP comprises:

measuring the power output from the fuel cell system;

generating a control signal in response to a measured difference between the power output and the MAPP; and adjusting the characteristics of the fuel cell system in response to the control signal to cause the power output to approach the MAPP.

21. The method of claim 19, wherein controlling the fuel cell system to generate a power output that approximates the MAPP comprises:

measuring the power output from the fuel cell system;

comparing the power output from the fuel cell system with the MAPP;

generating a control signal based on a measured difference between the power output and the MAPP; and causing the power output to approach the MAPP by adjusting a rate of fuel flow through a fuel flow controller in response to the control signal.

22. The method of claim 21, wherein using the target slope to determine the MAPP comprises analyzing the characteristics of the fuel cell system to determine a point along the curve above which damage to the fuel cell system may result from a further increase in the voltage of the fuel cell system.

23. A generator comprising:

a power generating device that includes a fuel cell;

a power measuring device configured to measure a power output from the power generating device;

a power slope targeting controller configured to determine a maximum allowable power point (MAPP) for the generator based on a power slope target for the generator, the power slope target not necessarily zero;

a comparator configured to compare the power output with a power output setpoint and to generate a control signal based on a difference between the power output setpoint and the power output; and a power controller configured to control the power output from the generator in response to the control signal from the comparator, the power controller including a flow controller configured to control a flow rate of fuel into the fuel cell based on the control signal.

24. The generator of claim 23, wherein the flow controller is configured to increase the flow rate of fuel into the fuel cell when the control signal indicates that the measured power output is below the power output setpoint.

25. The generator of claim 23, wherein the flow controller is configured to decrease the flow rate of fuel into the fuel cell when the control signal indicates that the measured power output is above the power output setpoint.

26. A fuel cell generator system comprising:

a fuel cell;

a power output measuring device configured to measure a power output from the fuel cell;

a power control system configured to operate the fuel cell at its maximum allowable power point (MAPP), the MAPP representing a power level above which damage may result to the fuel cell, the MAPP determined based on a target slope on a curve representing the fuel cell operating conditions, the target slope characterized as non-zero;

a comparator configured to compare the power output with a power output setpoint and configured to generate a control signal based upon the comparison; and a flow controller configured to control a flow rate of fuel into the fuel cell in response to the control signal.

27. The fuel cell generator system of claim 26, wherein the fuel cell generator system is connected to a grid.

28. The fuel cell generator system of claim 26, wherein the flow controller is configured to increase the flow rate of fuel into the fuel cell when the power output is below the power output setpoint.

29. The fuel cell generator system of claim 26, wherein the flow controller is configured to decrease the flow rate of fuel into the fuel cell when the power output is above the power output setpoint.

30. The fuel cell generator system of claim 26, wherein the MAPP is determined by identifying a target slope on a power curve for a standard set of operating conditions corresponding to the MAPP and by determining a point on the power curve that corresponds to the target slope.

* * * * *